United States Patent
Hannig (10) Patent No.: US 11,186,117 B2
(45) Date of Patent: Nov. 30, 2021

(54) PLASTIC-CONTAINING CARRIER FOR A DECORATED WALL OR FLOOR PANEL AND METHOD FOR PRODUCING THE SAME

(71) Applicant: AKZENTA PANEELE + PROFILE GMBH, Kaisersesch (DE)

(72) Inventor: Hans-Jürgen Hannig, Bergisch Gladbach (DE)

(73) Assignee: Akzenta Paneele + Profile GMBH, Kaisersesch (DE)

( * ) Notice: Subject to any disclaimer, the term of this patent is extended or adjusted under 35 U.S.C. 154(b) by 98 days.

(21) Appl. No.: 16/474,746

(22) PCT Filed: Dec. 29, 2017

(86) PCT No.: PCT/EP2017/084829
§ 371 (c)(1),
(2) Date: Jun. 28, 2019

(87) PCT Pub. No.: WO2018/127460
PCT Pub. Date: Jul. 12, 2018

(65) Prior Publication Data
US 2019/0315153 A1    Oct. 17, 2019

(30) Foreign Application Priority Data

Jan. 4, 2017   (EP) .................................... 17150300

(51) Int. Cl.
*B32B 3/10*      (2006.01)
*B44C 5/04*     (2006.01)
(Continued)

(52) U.S. Cl.
CPC ................ *B44C 5/04* (2013.01); *B32B 5/145* (2013.01); *B32B 5/16* (2013.01); *B32B 23/04* (2013.01);
(Continued)

(58) Field of Classification Search
None
See application file for complete search history.

(56) References Cited

U.S. PATENT DOCUMENTS

| 4,045,262 A | 8/1977 | Enzinger et al. |
| 6,322,737 B1 | 11/2001 | Beyer |
| (Continued) | | |

FOREIGN PATENT DOCUMENTS

| DE | 102013101795 A1 * | 5/2014 | ............ E04F 15/102 |
| DE | 202016101306 U1 | 4/2016 | |
| (Continued) | | | |

OTHER PUBLICATIONS

Machine translation of DE 102013101795 (Year: 2013).*
(Continued)

*Primary Examiner* — Christopher M Polley
(74) *Attorney, Agent, or Firm* — Harness, Dickey & Pierce, P.L.C.

(57) ABSTRACT

The present disclosure relates to a plastic-containing support for a decorated wall panel or floor panel, comprising a supporting material including a thermoplastic matrix material, in which a solid material with a particle size less than or equal to 800 μm is embedded, wherein the support has a length, a width and a thickness, wherein the support has a density gradient along its thickness from a bottom surface to a top surface arranged on the opposite side to the bottom surface in such a manner, that the density of the supporting material averaged over a specified width or a specified length of at least 5 mm, preferably at least 20 mm, from the bottom surface to the top surface initially declines and then increases again.

15 Claims, 3 Drawing Sheets

(51) Int. Cl.
    *B32B 5/14*     (2006.01)
    *B32B 5/16*     (2006.01)
    *B32B 23/04*     (2006.01)

(52) U.S. Cl.
    CPC ... *B32B 2307/4026* (2013.01); *B32B 2451/00* (2013.01); *B32B 2471/00* (2013.01); *Y10T 428/24802* (2015.01)

(56) References Cited

U.S. PATENT DOCUMENTS

| | | |
|---|---|---|
| 2006/0032175 A1 | 2/2006 | Chen et al. |
| 2010/0055420 A1* | 3/2010 | Vermeulen .............. B32B 27/32 428/207 |
| 2018/0272796 A1 | 9/2018 | Hannig |

FOREIGN PATENT DOCUMENTS

| | | |
|---|---|---|
| EP | 1009601 A1 | 6/2000 |
| EP | 1847385 A1 | 10/2007 |
| EP | 2829415 A1 | 1/2015 |

OTHER PUBLICATIONS

International Search Report (in English and German) and Written Opinion (in German) issued in PCT/EP2017/084829, dated Mar. 23, 2018; ISA/EP.

\* cited by examiner

PLASTIC-CONTAINING CARRIER FOR A DECORATED WALL OR FLOOR PANEL AND METHOD FOR PRODUCING THE SAME

CROSS-REFERENCE TO RELATED APPLICATIONS

This application is a National Stage of International Application No. PCT/EP2017/084829 filed on Dec. 29, 2017. This application claims the priority to European Patent Application No. 17150300.6, filed on Jan. 4, 2017. The entire disclosures of the above applications are incorporated herein by reference.

FIELD

The present disclosure relates to a carrier for a decorated wall or floor panel. The present disclosure further relates to a decorated wall or floor panel comprising such a carrier and to a method for producing a decorated wall or floor panel.

BACKGROUND

This section provides background information related to the present disclosure which is not necessarily prior art.

Decorated panels are known per se, wherein the term wall panel also means panels which are suitable as a ceiling or door lining. They usually consist of a carrier or core of a solid material, such as a wood material, which is provided on at least one side with a decorative layer and a covering layer and optionally with further layers, such as a wearing layer disposed between the decorative and the covering layer. The decorative layer is usually a printed paper impregnated with a resin or a printing layer applied onto the carrier by use of, for example, a suitable printing subsurface.

A method for producing a decorated wall or floor panel is known from document EP 2 829 415 A1, in which, starting from a granular carrier material, a carrier and subsequently a panel are formed. In such a method, for example, a WPC can be used as a carrier material.

Under certain circumstances, the production of the panels still offers potential for improvement. Potential for improvement may in particular arise with regard to the applicability at the site of the end user.

SUMMARY

This section provides a general summary of the disclosure, and is not a comprehensive disclosure of its full scope or all of its features.

It is therefore the object of the present disclosure to provide a carrier for a decorated wall or floor panel which, while having good properties, enables an improved applicability.

This object is achieved by a carrier with the features of claim 1. This object is further achieved by a decorated wall or floor panel with the features of claim 12 and by a method with the features of claim 13. Preferred embodiments of the disclosure are set forth in the dependent claims, in the description or in the figures, wherein further features described or shown in the dependent claims or in the description or in the figures may individually or in any combination constitute a subject matter of the disclosure, if the opposite is not clearly obvious from the context.

The disclosure proposes a plastic-containing carrier for a decoratively wall or floor panel comprising a carrier material with a thermoplastic matrix material in which a solid material having a particle size of less than or equal to 800 µm is embedded, wherein the carrier has a length, a width and a thickness, wherein the carrier has a density gradient along its thickness from a bottom surface to a top surface disposed opposite to the bottom surface such that the density of the carrier material averaged over a defined width or a defined length of at least 5 mm, preferably at least 20 mm, for example 25 mm, initially decreases from the bottom surface to the top surface and then increases again.

Such a carrier can offer significant advantages over the prior art solutions, for example in terms of applicability. The properties of the density gradient described below should preferably be present over the entire length and the entire width of the carrier, and it is within the scope of the present disclosure that the specific value or the magnitude of the density gradient in principle may vary in defined areas along the width or length.

The above-mentioned carrier is intended in particular for use in a decorated wall or floor panel.

The term "decorated wall or floor panel" or "decorative panel" in the sense of the disclosure means in particular wall, ceiling, door or floor panels comprising a decoration replicating a decoration template and applied onto a carrier plate. Decorative panels are used in a variety of ways, both in the field of interior design of rooms, as well as a decorative cladding of buildings, for example in exhibition stand construction. The decorative panels often comprise a decoration that is intended to replicate a natural material.

Examples of such replicated natural materials or decorative templates are wood species such as maple, oak, birch, cherry, ash, walnut, chestnut, wenge or even exotic woods such as Panga-Panga, mahogany, bamboo and bubinga. In addition, often natural materials such as stone surfaces or ceramic surfaces are replicated.

Accordingly, a "decorative template" in the sense of the present disclosure in particular means such an original natural material or at least a surface of such a material, which is to be imitated or replicated by the decoration.

A "carrier" may in particular be understood as a layer serving as a core or as a base layer in a finished panel. For example, the carrier may already impart an appropriate stability to the panel or contribute thereto.

Accordingly, a carrier material can be understood as a material which forms the carrier at least to a predominant part. In particular, the carrier can consist of the carrier material and comprises a thermoplastic matrix material, in which a solid material having a particle size of less than or equal to 800 µm, preferably less than or equal to 600 µm, is embedded.

The matrix material serves in particular to accommodate or embed the solid material in the finished carrier. The matrix material in this case comprises a thermoplastic material or a plastic mixture comprising at least one thermoplastic material.

Depending on the desired field of application and the desired characteristics of the panel, the proportions of matrix material and solid material may be selectable. As a result, a good adaptability to the desired field of application is enabled. In principle, however, it may be preferred that the proportion of the solid material is greater than or equal to the proportion of the matrix material.

Examples of thermoplastic materials, which may preferably serve as matrix material, include, for example, polyethylene or polypropylene or mixtures of the aforementioned plastics. It may further be preferred that the matrix material comprises polypropylene, such as in the form of LDPE, wherein the polypropylene may comprise a mixture of a homopolymer and a copolymer. In particular, a mixture of a homopolymer and a copolymer can provide particularly advantageous characteristics for the matrix material, for example in that they can be formed into a carrier in a range from ≤180° C. to 200° C., so that a particularly effective process control, for example at exemplary line speeds in a range of 6 m/min, can be achieved. Furthermore, the matrix material may in principle be free of an adhesion promoter.

As a copolymer, for example, a copolymer can be used, which is composed of propylene and ethylene as monomer units, for example consists thereof, wherein the density of the copolymer may be greater than or equal to the density of the homopolymer.

By use of a homopolymer, in particular a high melt flow rate can be achieved, wherein the melt flow rate of the homopolymer may in particular be greater than that of the copolymer. This can enable a particularly good formability of the carrier during the manufacturing process. Furthermore, the homopolymer can thereby enable a particularly good embedding of the solid material. In contrast, the copolymer can in particular serve the mechanical strength of the carrier material or of the carrier, since a copolymer often has a comparatively high hardness, in particular with respect to the homopolymer.

With respect to the distribution of homopolymer and copolymer, it may be preferable that the homopolymer, with respect to the polypropylene, is present in a proportion from ≥10 wt.-% to ≤40 wt.-%, for example in a proportion from ≥20 wt.-% to ≤30 wt.-%, such as in a proportion of ≥23 wt.-% to ≤28 wt.-%, and/or that the copolymer, with respect to the polypropylene, is present in a proportion from ≥60 wt.-% to ≤90 wt.-%, for example in a proportion from ≥70 wt.-% to ≤80 wt.-%, such as in a proportion from ≥72 wt.-% to ≤76 wt.-%, in particular wherein the polypropylene consists of the homopolymer and the copolymer.

With respect to the solid material which is distributed in the matrix material, it has a particle size of less than 800 µm, preferably less than 600 µm. As a result, the solid can be distributed very finely in the matrix material. The solid material may, for example, be a wood material, such as wood flour, or another material, such as a part of the rice plant, such as the rice spelt, the rice stem and the rice husk, or cellulose. Preferably, the matrix material may at least partially, for example at least locally limited, comprise an inorganic, for example mineral, material such as stone flour, chalk or other inorganic mineral materials. It may be particularly preferred if the solid material is formed from talcum, for example consists thereof. In principle, the solid materials may, without being restricted thereto, be present in the form of shreds, chips, flour or grains, for example in the form of a powder.

With regard to the use of wood as a solid, it is therefore possible to design a so-called WPC carrier which is basically known and has great acceptance.

Thus, in particular in this embodiment, a carrier according to the disclosure can be obtained by a modification of products known per se.

With regard to the use of talcum as a solid material, it may be advantageous that, in particular in this embodiment, a high stability can be achieved. In addition, such a carrier material can enable an improved moisture resistance, in particular with a reduced moisture or heat-induced swelling. Talcum is understood in a manner known per se as a magnesium silicate hydrate, which may have, for example, the chemical formula $Mg_3[Si_4O_{10}(OH)_2]$. It may be preferred, when the specific surface density according to ISO 4352 (BET) of the talcum particles is in a range from ≥4 $m^2/g$ to ≤8 $m^2/g$, such as in a range from ≥5 $m^2/g$ to ≤7 $m^2/g$. Furthermore, it may be advantageous, if talcum is present at a bulk density according to DIN 53468 in a range from ≥0.15 $g/cm^3$ to ≤0.45 $g/cm^3$, such as in a range from ≥0.25 $g/cm^3$ to ≤0.35 $g/cm^3$. It can preferably be provided that talcum is present in the form of particles having a particle size $D_{50}$ in a range from ≥3 µm to ≤6 µm, preferably in a range from ≥4 µm to ≤5 µm, such as 4.5 µm, and/or that talcum is present in the form of particles having a particle size $D_{98}$ in a range from ≥10 µm to ≤30 µm, preferably in a range from ≥15 µm to ≤20 µm, such as 17 µm. For determining the particle size distribution, basically the generally known methods, such as laser diffractometry, can be used, by means of which particle sizes in the range of a few nanometers up to several millimeters can be determined. By means of this method it is also possible to determine $D_{50}$ and $D_{98}$ values which respectively indicate that 50% ($D_{50}$) or 98% ($D_{98}$) of the measured particles are smaller than the respective specified value.

In a particularly preferred embodiment, it may be advantageous that the solid material, based on the solid material, is formed by talcum to at least 50 wt.-%, such as at least 80 wt.-%, in particular at least 90 wt.-%, for example at least 99 wt.-%, wherein the matrix material, based on the carrier material, is present in an amount from ≥20 wt.-% to ≤70 wt.-%, for example from ≥30 wt.-% to ≤55 wt.-% and wherein the solid material, based on the carrier material, is present in an amount from ≥30 wt.-% to ≤80 wt.-%, for example from ≥40 wt.-% to ≤65 wt.-%, and wherein the carrier material and the solid material together, based on the carrier material, are present in an amount of ≥90 wt.-%.

Thus, it may be advantageous that the carrier material consists to a large extent of the solid material and the matrix material. It can be particularly preferably provided that the matrix material and the solid material together, based on the carrier material, are present in an amount of ≥97 wt.-%, such as in an amount of 100 wt.-%, i.e., the carrier material consists of the matrix material and the solid material.

Particularly preferably, the carrier material can consist at least partially, i.e. in restricted layers, or completely of at least one polymeric thermoplastic material such as a plastic mixture as a matrix material, talcum and optionally an adhesion promoter. In particular in this embodiment, a production can be particularly cost-effective and the process control can be particularly simple.

For example, the carrier material may further comprise a fiber material that, based on the carrier material, is present in an amount from >0 wt.-% to ≤20 wt.-%, in particular from ≥3 wt.-% to ≤12 wt.-%, such as from ≥5 wt.-% to ≤10 wt.-%. With regard to the fiber material, it may be provided that the fiber material comprises fibers which are selected from the group consisting of plant, animal, mineral or even synthetic fibers.

Alternatively, it may be provided for example for wood, in particular for wood flour, that its particle size is between >0 µm and ≤600 µm with a preferred particle size distribution $D_{50}$ of ≥400 µm.

In addition, the carrier material may include between ≥0 wt.-% and ≤10 wt.-% of further additives, for example flow aids, thermo stabilizers or UV stabilizers.

The above-described carrier furthermore has a length, a width and a thickness. The length and the width are generally arranged perpendicular to each other and the thickness is in turn arranged perpendicular to the length and the width. The thickness extends from a bottom surface to a top surface, wherein the bottom surface is intended to be aligned to an underground, and wherein the top surface is to be aligned with respect to the decoration.

The above-described carrier is intended to have a density gradient along its thickness from a bottom surface to a top surface such that the density of the carrier material averaged over a defined width or a defined length of at least 5 mm, preferably at least 20 mm, for example 25 mm, initially decreases from the bottom surface to the top surface and then increases again. Thus, the density gradient is preferably not restricted to a smallest space or a linear area from the bottom surface to the top surface, but the density gradient can be present over a defined range of predetermined length or width, wherein the density values are averaged over this length or width, as will become apparent from the measuring method described below. Thus, not a random area of low density in a small area of the carrier is meant, but a desired density distribution over a defined area preferably over the entire width and/or length of the carrier.

With respect to said density values, these can be determined, for example, by means of X-rays, as is known, for example, for measurements along the thickness of chip, OSB and MDF board pieces. In this case, a sample may be placed between an X-ray source and a receiver and, for example after an appropriate calibration, by detecting the x-radiation passing through the carrier the density can be determined. In order to determine the density profile, it may in particular be advantageous to separate the corresponding panel into test samples for example of a size of 50×25 mm, and to irradiate X-rays parallel to the top or bottom surface through the sample successively, for example with displacement of the sample, from the top surface to the bottom surface, wherein the X-rays are irradiated over the width of 25 mm. By means of the data thus obtained, the density profile along the thickness can be determined. Thus, the density values or density profile mentioned always refer to an average value over a width of 25 mm of the panel or of the sample. For example, measurements can be carried out with the measuring device DPX300 of the company Imal.

For example, it may be provided that the carrier spaced apart from the bottom surface, which is intended to be placed toward an underground, and a top surface, which is intended to be provided with a decoration and faces away from the underground, has an absolute density minimum such that it is encompassed by local and/or absolute density maxima along the thickness of the carrier plate.

With respect to a density maximum or a density minimum, it may be provided that it is an absolute maximum or minimum, i.e. the lowest or highest density along the thickness, or a local minimum or maximum, i.e. a local density peak besides other local density peaks.

The specific values of the densities are in a manner obvious to the person skilled in the art dependent on the materials specifically used, that is, for example, the matrix material used and the solid. In addition, the magnitude of the density gradient can be defined by the selection of the specific densities.

For example, an absolute density maximum may be present in a range of $\geq 1400$ kg/m$^3$, for example $\geq 1460$ kg/m$^3$, such as in a range of $\geq 1480$ kg/m$^3$, wherein an upper limit may be $\leq 1600$ kg/m$^3$ may be given, and/or an in particular absolute minimum density may be present at <1459 kg/m$^3$, wherein a lower limit may be at $\geq 1250$ kg/m$^3$.

Furthermore, it can be provided that the distance between a first local density maximum and a second local density maximum is in a range from greater than or equal to half the carrier thickness to less than or equal to the carrier thickness, wherein the maxima refer to the corresponding opposite outer regions with respect the density minimum. The local density maxima can be absolute density maxima with respect to the respective outer region. It may also be advantageous that the respective maxima are spaced apart from the respective surface.

For example, it may be provided that a density gradient is present in such a way that the density initially decreases from a bottom surface to a top surface essentially constantly or fluctuating to a density minimum and subsequently increases constantly or fluctuating. In the sense of the present disclosure, a constant or fluctuating decrease or increase can be understood in that the density becomes successively constantly smaller or larger, or as a result decreases or increases from an outer region to an inner region, wherein in subsections density variations deviating from the result can occur.

In principle, it can be provided that the carrier has a density gradient such that it has a graduated, i.e. gradually varying density, from the top surface to the bottom surface.

For example, it may be provided that a density gradient is present in such a way that the density initially successively decreases from the top surface to the bottom surface over at least three, preferably at least five, measuring points and then successively increases over at least three, preferably at least five, measuring points, wherein the measuring points are appropriately present along the thickness and are in principle freely selectable and in particular different from each other. This may in particular mean that, taking into account certain possible variations, the density may decrease substantially continuously and subsequently increase again from the bottom surface to the top surface.

Alternatively or additionally, the carrier may have at least one inner and two outer regions disposed oppositely to each other, wherein along the thickness of the carrier a density gradient is provided such that the inner region has a lower density than the two outer regions, wherein the outer regions have a substantially constant density. In other words, the carrier has an inner region which along the thickness is encompassed by the first outer region and the second outer region in particular in the sense of a sandwich structure. Here, the term outer region in the sense of the present disclosure refers to the fact that this region with respect to the inner region is arranged further outwardly, i.e. closer to the surface of the carrier, than the inner region. The outer regions, that is, for example, the first outer region and the second outer region, can form or comprise the respective surface of the carrier, wherein the thickness of the carrier extends from the surface of the first region to the surface of the second region, however, the present disclosure is not limited thereto. In this case, the regions can have a substantially constant density, for example with a fluctuation of $\geq 0\%$ to $\leq 10\%$, for example from $\geq 0\%$ to $\leq 5\%$, based on the mean value of the density in this region.

Basically, the carrier may have a multi-layer structure, as described in detail below.

Preferably, the inner region of reduced density may have a thickness in a range of $>0\%$ to $\leq 50\%$, for example from $\geq 15\%$ to $\leq 40\%$ of the total thickness of the carrier. This embodiment can be definable in particular if, as may be advantageous in principle and independently of the respective embodiment, the inner region and the outer regions along the thickness each have at least partially a substantially constant density, as described above. Exemplary thicknesses of a carrier are for example in a range from $\geq 3$ mm to $\leq 6$ mm.

In the above-described carrier, it is thus provided that it has a comparatively high density at its outer regions and a comparatively low density at an inner region. This allows the carrier to have a high stability by means of its outer regions, so that the risk of damage to the panel during transport and during use is extremely low.

However, due to the fact that a central region has a lower density, the weight of the carrier can be significantly reduced despite the high stability characteristics described above, which offers significant advantages in use, such as during a laying process by an end user or during transport. The above-described carrier is thus designed in contrast to the prior art solutions in which carriers of the same species comprising a plastic matrix and a solid material with a very small size finely distributed therein, in particular a very homogeneous carrier material, was required. In the above-described carrier, however, a desired property matrix can be obtained by a heterogeneity which is not desired in the prior art and which was not or only to a limited extend possible in the prior art.

It becomes possible to adapt in particular the characteristics stability and weight in a desired manner to specific fields of application by means of a specific design of the density gradient.

Surprisingly, further significant benefits could thus be achieved while maintaining the stability by utilizing previously undesired characteristics in a targeted manner. In particular, in the case of the above-described carrier materials previously a high degree of homogeneity was desired, which is, however, to be prevented in a carrier described above.

Due to the fact that the matrix material further comprises a plastic, in particular a thermoplastic material, it may be enabled, despite the high stability, that panels made of the carrier material can be very elastic or resilient, which allows a comfortable impression when walking thereon and further to reduce the occurring noises when walking thereon compared to conventional materials, thus an improved footfall sound can be realized.

By limiting the materials of the carrier material and thus by a small number of materials for producing the carrier, the carrier can be produced particularly cost-effective. In addition, the process control of the production of a carrier or a panel can be very simple, so that, moreover, an easy and cost-effective production is enabled.

A previously described carrier material in particular with talcum as a solid material in a matrix material, as described above, offers in particular the advantage of a good moisture resistance. In particular, by use of a carrier material as described above, swelling of a panel produced from the carrier material when exposed to moisture can be significantly reduced or even completely prevented. Furthermore, an improved heat resistance can be provided, i.e., for example a heat-related expansion can be prevented or at least significantly reduced, and the use of talcum can furthermore offer advantages with respect to the modulus of elasticity and the creep resistance.

It may be preferred that the density gradient is formed by a trapped gas volume varying along the thickness of the carrier. This embodiment can enable a particularly low density in a particularly cost-effective manner, so that the weight of the carrier can be reduced particularly effectively. For example, this embodiment can be realized by selecting the raw product for producing the carrier, for example selecting the particle size of granules used. Furthermore, this embodiment may be feasible by use of foamed materials in the inner layer. In addition, in particular in this embodiment, a material saving can be achieved, which can save costs in the production.

Furthermore, it may be preferred that the density gradient is formed by a varying solid material content along the thickness of the carrier. In this embodiment, the density gradient can be represented in a particularly defined manner, since the arrangement of the solid material in the matrix can be controlled very precisely. This embodiment can furthermore be characterized in that the stability of the carrier can be particularly high without air inclusions.

Furthermore, it may be preferred that the density gradient is formed by a varying type of the carrier material along the thickness of the carrier, i.e., for example, of the solid material and/or of the matrix material. For example, the carrier material may include a solid material in a high-density region which differs from that in a low-density region and/or may differ accordingly with respect to the matrix material. For example, the carrier material in the high-density region may exclusively or in addition comprise talcum and in the low-density region may comprise exclusively or in addition another solid. Thus, the solid material added to the carrier material may in particular have a reduced density compared to talcum. For example, the lighter added substance may have a raw density in a range of $\leq 2000$ kg/m$^3$, in particular $\leq 1500$ kg/m$^3$, for example $\leq 1200$ kg/m$^3$, more preferably $\leq 500$ kg/m$^3$. By way of example, the further lighter solid material may be selected from the group consisting of wood, for example in the form of wood flour, expanded clay, volcanic ash, pumice, cellular concrete, in particular inorganic foams and cellulose. With respect to cellular concrete, this may be, for example, the solid material provided by the company Xella under the brand name Ytong which consists essentially of quartz sand, lime and cement.

With respect to the carrier material, this may include the same materials but differ in its density. This can be realized, for example, by applying a vacuum during an extrusion process in the production process of the matrix material, which can be realized in an extruder. As a result, at a higher vacuum, a relative higher density can be achieved and at a lower vacuum a relative lower density can be achieved.

It may further be preferred that a density gradient is present such that the density decreases along the thickness by a value in the range from >0% to $\leq 30\%$, for example, from >0% to $\leq 20\%$, such as from $\geq 2\%$ to $\leq 17\%$, wherein the values mentioned relate to an in particular absolute density maximum and an in particular absolute density minimum along the thickness.

Surprisingly, it has been found that in particular in this embodiment a good stability and at the same time a significant weight saving can be achieved.

With regard to further technical features and advantages of the carrier, reference is hereby explicitly made to the description of the panel, the method and the figures.

The present disclosure further relates to a decorated panel, in particular a decorated wall or floor panel comprising a carrier and a decorative layer applied onto the carrier, in particular wherein a covering layer provided with a structure is applied on the decorative layer. Such a panel is characterized in that the carrier is configured as described in detail above. With reference to the specific features it is thus referred to the above description.

The edge regions of the panel can be structured or profiled in order to provide in particular detachable connecting elements. In this regard, in a profiling in the sense of the disclosure it may be provided that at least in a part of the edges of the decorative panel a decorative and/or functional profile is formed by means of suitable material removing tools. Herein, a functional profile means for example the formation of a groove and/or tongue profile in an edge in order to make decorative panels connectable to each other by means of the formed profiles. Here, in particular with groove and/or tongue profiles, elastic materials are of advantage since by means of these alone such profiles can be produced which are particularly easy to handle and stable. Thus, in particularly no further materials are necessary to produce the connecting elements.

In summary, the above-described panel can provide the advantage of a high dimensional stability with respect to heat and moisture influence with simultaneously good mechanical properties and light weight. Furthermore, such a panel can be very stable and at the same time have a high elasticity, which may be advantageous in particular for an effective and cost-effective design of connecting elements at the edge region of the carrier and moreover with regard to footfall sound insulation.

With regard to further technical features and advantages of the panel, reference is hereby explicitly made to the description of the carrier, the method and the figures.

Subject matter of the present disclosure is moreover a method for producing a carrier for a decorated wall or floor panel, comprising the steps of:

a) providing a granular carrier material, wherein the carrier material comprises a thermoplastic matrix material and an in particular inorganic solid material having a particle size of less than or equal to 800 μm, and b) forming a carrier with a length, a width and a thickness while treating the carrier material with temperature and pressure, characterized in that the carrier material is selected or treated in step b) such that the carrier has a density gradient along its thickness from a bottom surface to a top surface disposed opposite the bottom surface such that the density of the carrier material averaged over a defined width or a defined length of at least 5 mm, preferably at least 20 mm initially decreases from the bottom surface to the top surface and then increases again.

By means of the above-described method, a carrier can be configured in an advantageous manner, as described in detail above. With regard to the advantages of the carrier, reference is made to the above description.

In accordance with method step a), a granular carrier material is thus provided, wherein the carrier material comprises a thermoplastic matrix material and a solid material having a particle size of less than or equal to 800 μm. The granular carrier material can be provided as prefabricated carrier material particles, wherein the particles comprise a solid material already embedded in the matrix material. Such carrier material particles can be obtained, for example, by an extrusion process, wherein all constituents of the carrier material are processed in an extruder.

With regard to the extrusion process it may be provided that a vacuum is applied in the extruder. By means of the amount of vacuum generated, the density of the carrier material can be adjusted, wherein at a high vacuum, i.e. a relatively low pressure, a comparatively higher density can be achieved, and at a comparatively low vacuum, i.e. a comparatively high pressure, a lower density can be achieved.

A granular carrier material may be understood as a solid material or an aggregate of a solid material which comprises or consists of a plurality of solid particles, such as grains or spheres. Exemplary, without being exhaustive, granular or powdery materials may be mentioned here. The carrier material is the material from which the carrier is designed, in particular of which the carrier consists. With regard to the carrier material used it is referred to the above description of the panel.

According to method step b), the carrier is formed for example as a web-shaped carrier which can subsequently be divided into a smaller size with a length, a width and a thickness under treatment of the carrier material with temperature and pressure.

For example, the granular carrier material may be placed between two belt-like conveying means, which are moved circumferentially, so that between the conveying means the carrier may be formed by the action of pressure and heat, in particular under at least partial melting of the matrix material. The carrier material can thus be applied onto the lower conveying means and then be restricted by the lower and the upper conveying means. For example, the conveying means can pass through one or a plurality of pressing means and heating means and optionally cooling means in order to form the carrier in a suitable manner. The belt-like conveying means may at least partially be made of polytetrafluoroethylene (PTFE). For example, the belts may be formed entirely of polytetrafluoroethylene, or glass fiber reinforced plastic belts or steel belts with a polytetrafluoroethylene coating may be used.

The placement of the carrier material can be realized in particular by means of one or a plurality of scattering heads, which can discharge the carrier material in a defined way for example from storage containers. The individual scattering heads can be equipped with the same or with different materials. For example, the scattering heads can be arranged one behind the advancing direction of the carrier material, in order to achieve a layer structure of the carrier.

Alternatively, individual layers for example prefabricated as semi-finished products can be laid on each other.

In a further step, for example after placing the carrier material, the carrier material placed between the belt-like conveying means is formed under the action of temperature or heat. In this method step the carrier material or at least a part thereof is melted or softened by the applied heat or thermal energy, whereby, for example, the granulate can become formable. In this state, it can fill the receiving space formed between the conveying means and thus form for example a web-shaped carrier which can be further treated.

As pressing means, for example, rollers and/or a double belt press can be used. Insofar as a double belt press is used as a pressing means, in this as a final step in the carrier production in particular the surface characteristics of the carrier can be adjusted with low pressure and low compression within a very narrow range, such as with a compression from >0% to ≤7%, for example 5%.

After passing through the pressing and/or heating means, such as a double belt press as an in particular final compressing means, the carrier produced can be stored initially in a web-shaped form or as separated plate-like carriers as an intermediate product and the method can be completed temporarily. Preferably, however, further treatment steps follow immediately.

For producing a finished panel, the previously produced carrier can subsequently be provided with a decoration or a decorative layer and this can be coated with a protective layer or a wearing or covering layer.

In order to apply a decoration, first a decoration subsurface can be applied onto at least a portion of the carrier. For example, in particular for printing processes, initially a primer can be applied as a decoration subsurface, for example in a thickness from ≥10 μm to ≤60 μm. In this case, a liquid radiation-curing mixture based on a urethane or a urethane acrylate, optionally with one or more of a photoinitiator, a reactive diluent, a UV stabilizer, a rheology agent such as a thickener, a radical scavenger, a flow control agent, a defoamer or a preservative, a pigment and/or a dye can be used as a primer.

In addition to the primer, a white colored undercoat may be applied. For example, the undercoat may include polyurethane, for example be formed as a polyurethane varnish, and, for example, can be provided with white pigments.

In addition to the use of a primer it is possible to apply the decoration onto a decorative paper printable with a corresponding decoration, which may be provided for example by means of a resin layer as a bonding agent previously applied to the carrier. Moreover, a resin can be applied as a printing subsurface onto the paper, which as a resin component may comprise at least one compound selected from the group consisting of melamine resin, formaldehyde resin, urea resin, phenol resin, epoxy resin, unsaturated polyester resin, diallyl phthalate or mixtures thereof.

Subsequently, the decoration can be produced in particular by a printing process, wherein flexographic printing, offset printing or screen printing processes and in particular digital printing techniques such as inkjet processes or laser printing processes are suitable. The decorative layer can be formed from an in particular radiation-curable paint and/or ink. For example, a UV-curable paint or ink may be used.

It is also possible, if appropriate, first, for example prior to the printing process, to carry out a pretreatment of the carrier for electrostatic discharge and, if appropriate, subsequent electrostatic charging. This may in particular serve to avoid the occurrence of blurring in the course of the application of the decoration.

With respect to the wearing or covering layer, which is applied on top of the decorative layer it may be provided that it is laid on the printed carrier as a pre-produced overlay layer, for example based on melamine, and bonded to the carrier by pressure and/or heat exposure. Furthermore, it may be preferred that likewise a radiation-curable composition, such as a radiation-curable lacquer, for example an acrylic lacquer, is applied to form the wearing and/or covering layer. Here, it can be provided that the wearing layer includes hard materials such as titanium nitride, titanium carbide, silicon nitride, silicon carbide, boron carbide, tungsten carbide, tantalum carbide, alumina (corundum), zirconium oxide or mixtures thereof, in order to increase the wear resistance of the layer. In this case, the application can take place for example by means of rollers, such as rubber rollers or by means of pouring devices.

In particular, a structure, in particular a surface structure matching with the decoration, can be introduced into the protection layer or the wearing or covering layer by introducing pores. This can be realized, for example, by embossing corresponding structures.

It may be particularly preferred if the wearing or covering layer is printed onto the surface, for example by means of an inkjet printer and/or by multiple application, since thereby highly accurate structures can be produced.

Returning to the above described method of producing a carrier, it is contemplated that the carrier material is selected or treated in method step b) such that the carrier has a density gradient along its thickness from a bottom surface to a top surface disposed opposite to the bottom surface such that the density of the carrier material averaged over a defined width or a defined length of at least 5 mm, preferably at least 20 mm, for example 25 mm, initially decreases from the bottom surface to the top surface and then increases again.

With regard to the advantages of a carrier produced in this way, reference is made to the above description.

For example, the method described above can be carried out in such a way that the carrier is constructed multi-layered so that at least an inner region in the direction of thickness is formed of a first granular carrier material and that two outer regions encompassing the inner region along the thickness of the carrier are made of a second granular carrier material, wherein the first granular carrier material is different from the second granular carrier material in at least one of the density, the size and the shape of the granular carrier material. For example, the carrier may be formed only in these three regions. In particular, in this embodiment, when forming the carrier, it can be achieved that air inclusions or a material of lower density are present in the interior of the carrier, so that the above-described density gradient occurs.

Furthermore, the particles may already include the solid material embedded in the matrix material.

For example, the outer regions can be formed by a carrier material which has a comparatively small particle shape, whereas the central region can be formed by use of a carrier material having a comparatively large particle size. As a result, the carrier material can form a denser packing in an outer region, which leads to a higher density after forming the carrier.

The same can be achieved, for example, if the particle shape in the outer regions is different from that in an inner region. For example, the particle shape can be chosen respectively such that the particles in an outer region are more densely packed than in the inner region.

In addition, in this embodiment, by adjusting the size the density gradient can be tailored to the desired field of application.

In principle, it may be provided that the carrier is constructed from a plurality of layers along the thickness in such a way that along the thickness at least three, for example at least five, layers are present. For example, with three layers, the outer layers can be identical and can be different from one or three inner layers, or with five layers from top to bottom the first and the fifth layer may be identical and the second and the fourth layer may be identical, wherein the first and the fifth layer being different from the second and fourth and third layers. In particular with at least three, preferably at least five provided layers comprising a carrier material, an advantageous adaptation to the desired field of application or the desired properties can be enabled by adjusting a density gradient in a particularly defined way.

In principle, the multilayer construction can be realized by successively scattering or depositing the different layers on one another in a method described herein.

In particular, in such a multi-layered structure it may be provided that at least in a layer comprising the top surface, a colorant such as a dye, in particular a pigment, is present or introduced. For example, a white dye such as titanium dioxide may be provided. This allows a uniform printing subsurface, in particular with regard to a color design, so that a particularly high-quality decoration can be formed. The advantage of titanium dioxide ($TiO_2$) can be seen in particular in the fact that this pigment makes the compound thermally stable and also chemically inert. Furthermore, it is light-resistant, inexpensive, and non-toxic, so that it can be integrated into a carrier or in a carrier material without any problems.

It may be provided that the colorant such as the dye or the pigment is present only in the layer comprising the top surface, or in other layers, too.

In particular, organic and inorganic pigments and mixtures of organic and inorganic pigments can be used as colorants. The pigments are preferably present in fine form. Accordingly, the pigments usually have mean particle sizes from 0.1 to 5 μm, in particular from 0.1 to 3 μm, and particularly preferably 0.1 to 1 μm. The organic pigments are usually organic colored and black pigments. Inorganic pigments can also be color pigments (colored, black and white pigments) and luster pigments.

It may also be preferred that at least in a central layer a recycled material is incorporated or introduced. For example, a recycled material may be embedded in only one or in more inner layers. Thus, it may be preferred that the outer layers comprise a non-recycled material, but one or multiple inner layers comprise a recycled material. As a result, a particularly cost-sensitive production of the carrier can be enabled. In addition, in this way a manufacturing process can be environmentally friendly and resource-saving.

In particular, the recycled material may have the same composition as the originally used and above-described matrix material which is also used in the other layers without recycled material. This despite the use of recycled material allows very homogeneous properties of the carrier or the different layers. Thus, the recycled material may in particular comprise recycled matrix material. Basically, however, the entire carrier material can be recycled accordingly, such as when rejects are produced.

It may further be preferred that a flame retardant is provided or introduced in at least one outer layer. For example, only one outer layer or the two outer layers can be provided with a flame retardant, or all layers can be provided with a flame retardant. This may in particular allow a further improved resistance to burn-off and thus enable a more universal applicability.

Flame retardants are known as mixtures of organic and/or inorganic substances which are intended to prevent or at least partially retard an inflammation or merely an ignition of wood- or wood-like materials, plastics, textiles, paper, paperboard, cardboard, synthetic and natural fibers and fabrics, paints, or products thereof, building materials, insulating materials, electrical and/or cable insulation etc. In addition, they are intended in particular to hamper a combustion of these substances. Examples of flame retardants which may be provided in at least one layer include, for example, expanded graphite. Furthermore, the flame retardant or fire retardant may be present in a proportion in a range of up to a maximum of 45 wt.-%, wherein the proportion may be adaptable to the field of application. Alternatively, it may be possible to use a fire retardant substance which is fire retardant by releasing gases with temperature changes. This is enabled, for example, by incorporating non-flammable gases, such as nitrogen, in the carrier material, which are released when a heat-related deformation of the carrier occurs. Accordingly, liquids may be added, which are released upon heat development and pass into the gaseous state, thus enabling a fire retardant effect.

It may further be preferred that a central layer is designed as WPC material. The outer layers may include an inorganic filler as described above, but be free from organic substances such as wood. Furthermore, a matrix material may be present as a binding material. The proportions can be set as known from the prior art for WPC materials.

The wood in the WPC layer can be provided in a manner known per se by wood chips or wood fibers. The matrix material may again in particular be a thermoplastic material as described above.

The advantage of embedding a WPC layer can in particular be seen in the fact that a weight saving can be enabled which is particularly advantageous for the transport and/or for the end user due to easier handling. In addition, in this embodiment, too, in particular in comparison with a pure WPC carrier an improved resistance to moisture can be achieved.

Furthermore, cost savings can be achieved in this embodiment.

It may also be preferred that in at least one outer layer, such as in the layer comprising the top surface, an odor inhibitor is provided or introduced. In this embodiment, a further improved applicability can be provided, since the panel comprising such a carrier can also improve the indoor climate.

Suitable odor inhibitors may in principle be all substances which have a corresponding effect and can be incorporated into the carrier or in at least one layer, such as metal salts, mineral compounds or organic compounds.

Alternatively or additionally, it may be provided that method step b) is carried out such that carrier material or matrix material arranged in an inner region is incompletely melted. This embodiment can be enabled in particular by a suitable temperature control, for example by ensuring that the carrier is not completely heated. For example, the line speed can be chosen so high and/or the temperature can accordingly be chosen so low that, for example, only outer regions are melted, while an inner region is not or at least not completely melted. As a result, the carrier material inside the carrier can retain trapped air even under pressure, which can reduce the density inside the carrier.

A corresponding effect can also be achieved by selecting the pressure to be sufficiently low during the formation of the carrier, so that the carrier material, for example the matrix material, is not homogeneously pressed or compressed over the entire thickness, but instead obtains a heterogeneous structure through the thickness such that the carrier material is compressed less in an inner region than in an outer region.

It can be seen from the above that the density profile can basically be adjusted solely by the method parameters used. The provision of pore-forming agents in the carrier material can therefore in principle be dispensed with.

It may also be preferred that the granular carrier material along the thickness of the carrier has a different full width at half maximum of the particle size such that the full width at half maximum is smaller in an inner region than in the outer regions, which sandwich the inner region along the thickness, i.e. in the outer region facing away from the central region of the top surface and in the outer region facing the central region of the bottom surface. The full width at half maximum of the particle size can be present in one or both outer regions in a range of $\geq 1.8$ mm, in particular $\geq 2$ mm, for example $\geq 2.3$ mm, in particular $\geq 2.5$ mm, wherein the upper limit can basically be chosen arbitrary and, for example, be $\leq 6$ mm, such as $\leq 4.5$ mm, for example $\leq 3$ mm. Accordingly, the full width at half maximum in the central region may be lower. For determining the particle sizes the well-known procedures such as laser diffraction can be used, by means of which particle sizes in the range from a few nanometers up to several millimeters can be determined. The full width at half maximum, which is also referred to as FWHM, is to be understood in a manner known per se in particular as the difference between the two argument values for which the function values have decreased to half of the maximum, clearly spoken in a corresponding graphical curve the "width at half height".

Surprisingly, it has been found that a carrier material having a large full width at half maximum and thus a comparatively inhomogeneous particle size distribution can significantly improve or homogenize a melting of the carrier material or, at a small full width at half maximum can significantly reduce or heterogeneize a melting of the carrier material. In detail, by using a carrier material in this embodiment a complete melting of the carrier material in the outer regions can be accelerated, which may in particular be of advantage for a high density and thus a high stability, and slowed down in the inner region, which can slow down the melting and reduce the density. In addition, it could surprisingly be found that by using a pourable carrier material in this embodiment after the above-described treatment or preparation carriers can be provided, which may have a particularly smooth and therefore high-quality surface. For example, a corrugation of the carrier surface with a wave depth in a range of 20-40 µm can be achieved.

In this case, the particle size distribution in this embodiment is in contrast to requirements which are often known in the prior art and which do not require an inhomogeneity of the particle sizes, but rather require the use of highly homogeneous pourable starting materials.

In particular in the region of comparatively higher density carrier materials may be provided which have a particularly suitable fine grain fraction, in particular in the outer layers. For example, here the fine grain fraction may be in a range from >0 wt.-% to ≤50 wt.-%, for example from ≥5 wt.-% to <40 wt.-%, such as in a range from ≥10 wt.-% to <30 wt.-%, determined by use of a screen of 2 mm mesh size. In other words, the carrier materials may comprise particles having a size in a range of <2 mm in one of the aforementioned regions. Furthermore, in addition to an aforementioned fine grain fraction, moreover, comparatively large particles may be provided in the carrier material. For example, it may be provided that a fraction having a particle size in a range of ≤3 mm, for example 4 mm, is present in a proportion of ≥30 wt.-%, for example ≥40 wt.-% in the carrier material. It can thus be seen from the above that the full width at half maximum of the particle size is comparatively large due to a comparatively high inhomogeneity of the particle sizes.

With regard to further technical features and advantages of the above-described method, reference is made explicitly to the above description of the carrier material and of the panel.

DRAWINGS

The disclosure is explained below with reference to the figures and an exemplary embodiment.

Corresponding reference numerals indicate corresponding parts throughout the several views of the drawings.

DETAILED DESCRIPTION

Example embodiments will now be described more fully with reference to the accompanying drawings.

Figure 1:
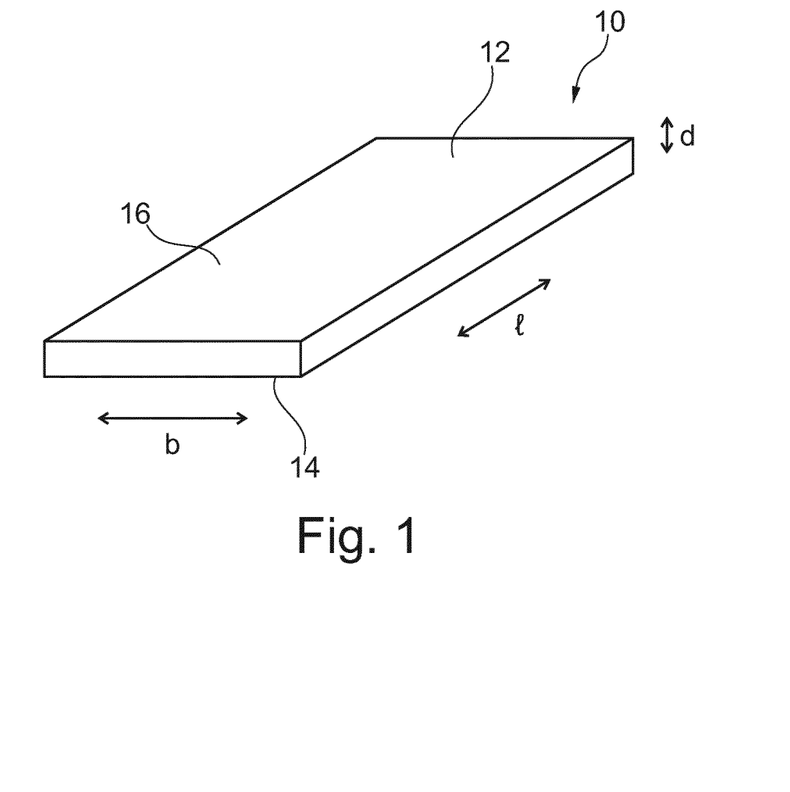
FIG. 1 shows schematically a view of a carrier according to the disclosure.
Figure 2:
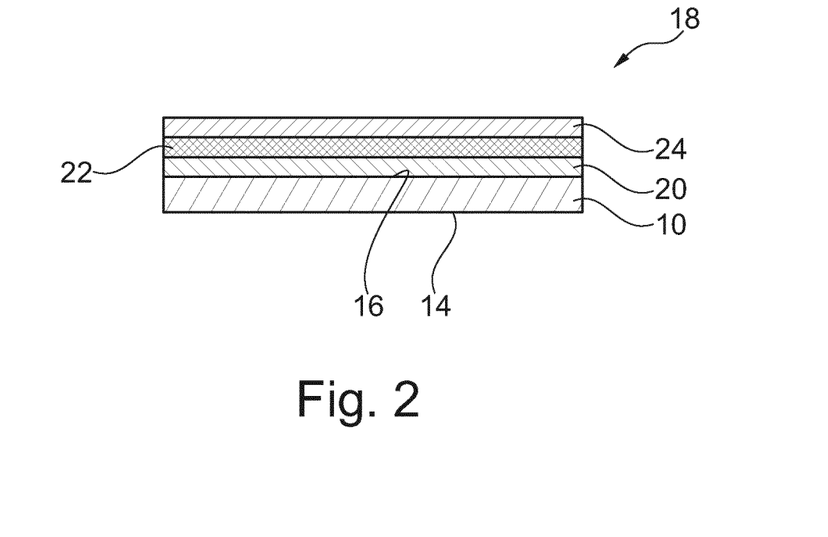
FIG. 2 shows schematically a sectional view through a panel according to the disclosure.

FIG. 1 schematically shows a view of a plastic-containing carrier 10 for a decorated wall or floor panel 18, which is shown in a sectional view in FIG. 2. The carrier 10 comprises or consists of a carrier material 12, wherein the carrier material 12 comprises a thermoplastic matrix material in which a solid material having a particle size of less than 800 µm is embedded. The carrier 10 has a length l, a width b and a thickness d. Such a carrier 10 is intended to have a density gradient along its thickness from a bottom surface 14, which is intended to be aligned with respect to an underground, to a top surface 16, which is intended to be provided with a decoration and is disposed opposite to the bottom surface 14, such that the density of the carrier material 12 initially decreases from the bottom surface 14 to the top surface 16 and then increases again. This should basically not be locally restricted but be provided at least over a defined width (b) or a defined length (l) of at least 5 mm, preferably at least 20 mm, with respect to density values averaged over this range.

On the top surface 16, for example, a printing subsurface 20, a printing layer provided as a decorative layer 22 and a structured covering layer 24 may be provided to form a panel 18.

Figure 3:
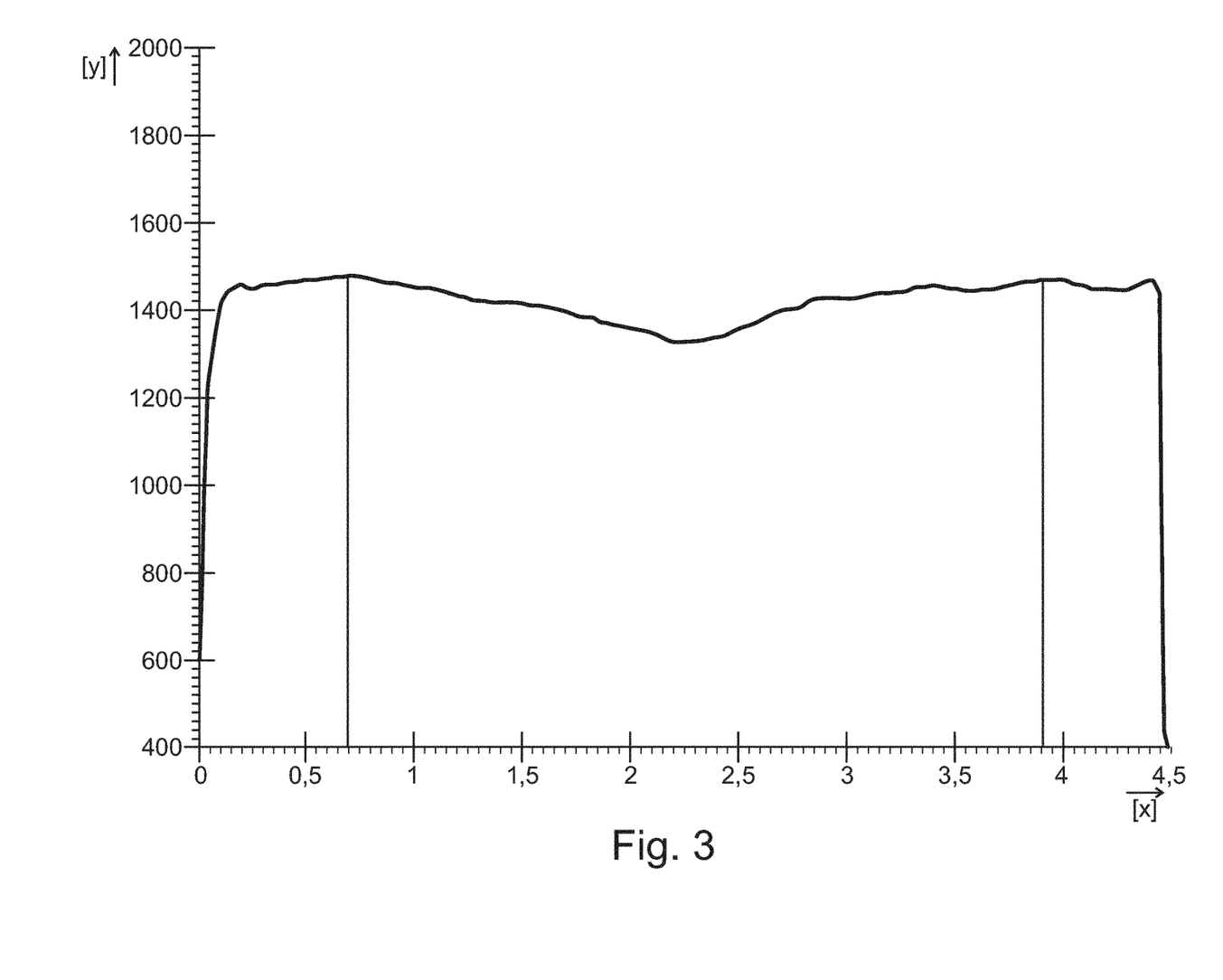
FIG. 3 shows an exemplary density profile through a carrier according to the disclosure.
Figure 4:
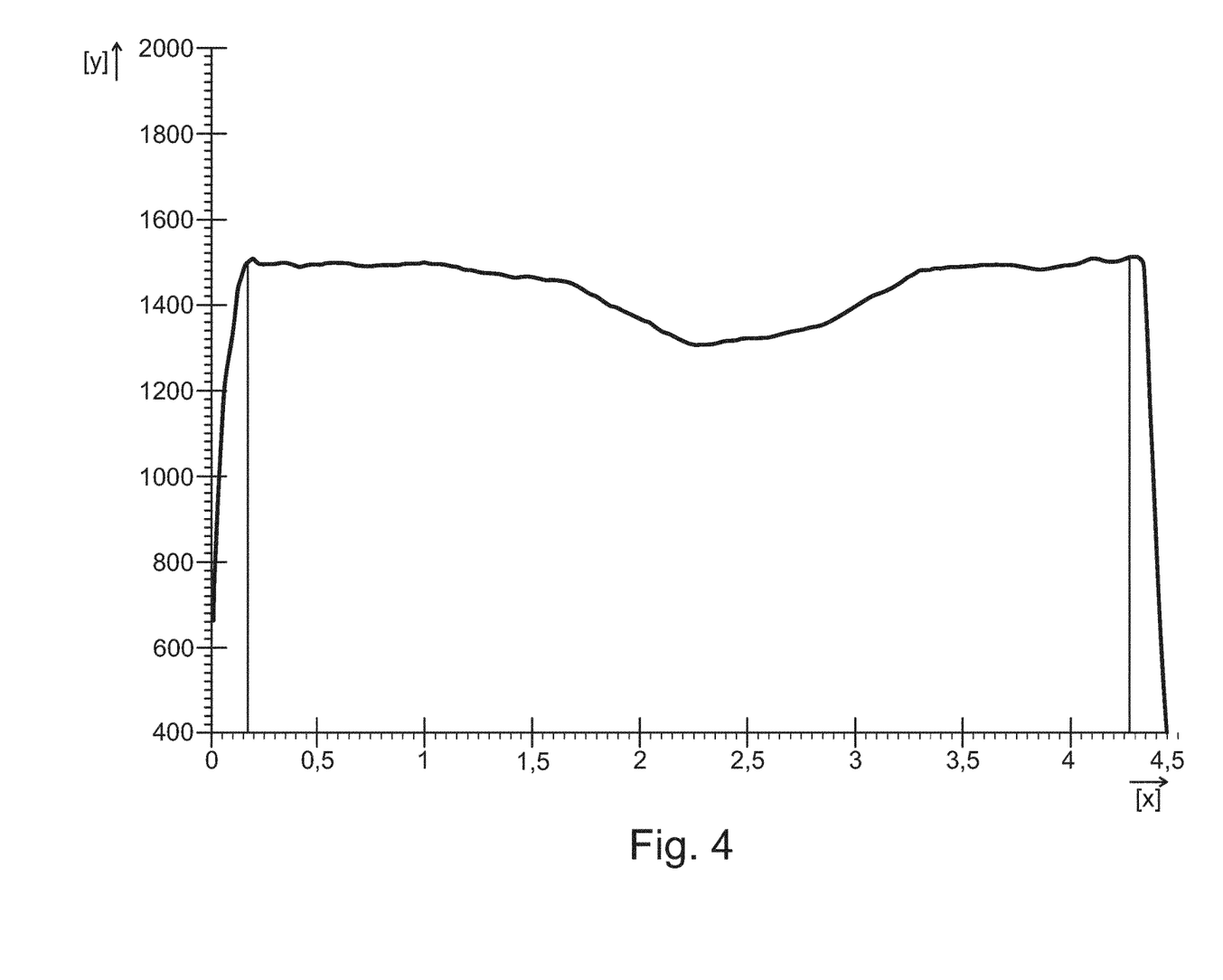
FIG. 4 shows an exemplary density profile through another carrier according to the disclosure.

FIGS. 3 and 4 respectively show density profiles through embodiments of a carrier 10, wherein the x-axis shows the carrier thickness in mm and the y-axis shows the density in kg/m$^3$.

FIG. 3 shows an embodiment in which a density gradient is present such that the density decreases comparatively fluctuating from the bottom surface 14, shown here on the right, to the top surface 16 up to a density minimum and then increases again comparatively fluctuating.

FIG. 4 shows an embodiment in which the carrier 10 comprises an inner and two outer regions disposed oppositely to each other along its thickness d, wherein a density gradient being present along the thickness d of the carrier such that the inner region has a lower density than the two outer regions, wherein the two outer regions have a substantially constant density. The outer region extends within a thickness of approximately 1.6 mm to 3.2 mm, wherein the outer regions have a substantially constant density of about 1500 kg/m$^3$. In between, there is a density minimum with significantly reduced density.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a select-ed embodiment, even if not specifically shown or described. The same may also be varied in many ways. Such variations are to be regarded as a departure from the disclosure, and all such modifications are intended to be included within the scope of the disclosure.

The invention claimed is:

1. A plastic-containing carrier for a decorated wall or floor panel, comprising a carrier material including a thermoplastic matrix material, in which a solid material having a particle size of less than or equal to 800 µm is embedded, wherein the carrier has a length, a width and a thickness, wherein the carrier has a density gradient along its thickness from a bottom surface to a top surface which is disposed opposite to the bottom surface such that the thickness of the carrier material averaged over a defined width or a defined length of at least 5 mm, initially decreases from the bottom surface to the top surface and then increases again.

2. The carrier according to claim 1, wherein the density gradient is present such that the density from the bottom surface to the top surface initially decreases successively over at least three measuring points and subsequently increases successively over at least three measuring points.

3. The carrier according to claim 1, wherein the density gradient is formed by a varying trapped gas volume along the thickness of the carrier.

4. The carrier according to claim 1, wherein the density gradient is formed by a solid content which is varying along the thickness of the carrier.

5. The carrier according to claim 1, wherein the density decreases along the thickness of the carrier by a value in the range of >0% to ≤30%, wherein said values relate to a density maximum and a density minimum along the thickness.

6. The carrier according to claim 1, wherein the carrier is constructed of a plurality of layers along the thickness such that at least three layers are present along the thickness.

7. The carrier according to claim 6, wherein at least in a layer which comprises the top surface a colorant is present.

8. The carrier according to claim 6, wherein at least in a central layer a recycled material is incorporated.

9. The carrier according to claim 6, wherein at least one outer layer is provided with a flame retardant.

10. The carrier according to claim 6, wherein at least one outer layer is provided with an odor inhibitor.

11. The carrier according to claim 1, wherein the solid material, based on the solid material, is formed to at least 50 wt. % of talcum, wherein the matrix material, based on the carrier material, is present in an amount from ≥20 wt.-% to 70 wt. %, and wherein the solid material, based on the carrier material, is present in an amount from ≥30 wt.-% to 80 wt. %, and wherein the carrier material and the solid material together, based on the carrier material, are present in an amount of ≥90 wt.-%.

12. A decorated panel comprising a carrier and decorative layer applied on the carrier, wherein the carrier is a carrier according to claim 1.

13. A method for producing a carrier for a decorated wall or floor panel, comprising the method steps:
 a) providing a granular carrier material, wherein the carrier material comprises a thermoplastic matrix material and a solid material having a particle size of less than or equal to 800 μm; and
 b) forming a carrier with a length, a width and a thickness under treatment of the carrier material with temperature and pressure;
 wherein
  the carrier material is selected such or treated in step b) such that the carrier has a density gradient along its thickness from a bottom surface to a top surface, which is disposed opposite to the bottom surface, such that the density of the carrier material averaged over a defined width or a defined length of at least 5 mm initially decreases from the bottom surface to the top surface and then increases again.

14. A method according to claim 13, wherein method step b) is carried out such that matrix material disposed in an inner region is melted incompletely.

15. The method according to claim 13, wherein the carrier material is provided by an extrusion process, wherein a vacuum is applied to the extruder.

* * * * *